US009847922B2

(12) United States Patent
Peach et al.

(10) Patent No.: US 9,847,922 B2
(45) Date of Patent: Dec. 19, 2017

(54) SYSTEM AND METHOD FOR CONTINUOUS MEASUREMENT OF TRANSIT LATENCY IN INDIVIDUAL DATA SWITCHES AND MULTI-DEVICE TOPOLOGIES

(71) Applicant: Arista Networks, Inc., Santa Clara, CA (US)

(72) Inventors: John Peach, Maidenhead (GB); Subhachandra Chandra, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/662,055

(22) Filed: Mar. 18, 2015

(65) Prior Publication Data

US 2016/0277272 A1 Sep. 22, 2016

(51) Int. Cl.
*H04L 12/28* (2006.01)
*H04L 12/26* (2006.01)

(52) U.S. Cl.
CPC ........ *H04L 43/0858* (2013.01); *H04L 43/106* (2013.01)

(58) Field of Classification Search
CPC ........................... H04L 43/0858; H04L 43/106
See application file for complete search history.

(56) References Cited

U.S. PATENT DOCUMENTS

| | | | | |
|---|---|---|---|---|
| 5,394,395 A * | 2/1995 | Nagai | ................. | H04L 12/5601 370/395.4 |
| 5,414,705 A * | 5/1995 | Therasse | ................. | H04L 49/30 370/352 |
| 6,272,131 B1* | 8/2001 | Ofek | .................... | H04L 12/6418 370/389 |
| 7,729,387 B2* | 6/2010 | Beck | ..................... | H04J 3/0632 370/518 |
| 8,228,923 B1* | 7/2012 | Jain | ....................... | H04J 3/0682 370/350 |
| 8,989,010 B2* | 3/2015 | Beheshti-Zavareh | . | H04L 47/283 370/236 |
| 9,054,967 B1* | 6/2015 | Edsall | ................. | H04L 43/0852 |
| 2001/0021176 A1* | 9/2001 | Mimura | ................ | H04L 1/0026 370/235 |
| 2005/0157705 A1* | 7/2005 | Galetto | ................... | H04L 12/24 370/352 |

(Continued)

*Primary Examiner* — Phuc Tran
(74) *Attorney, Agent, or Firm* — Blakely Sokoloff Taylor & Zafman LLP

(57) ABSTRACT

A system, method, and associated apparatus for continuous measurement of transit latency in individual data switches and multi-device topologies is disclosed, which enables an accurate measure of real-word latency on production networks by applying a time stamp to production network data on ingress to a network element and determining a traversal time by capturing the time stamp on egress from the network element. In one embodiment, time stamps applied to network data are removed on egress to avoid undesirable packet growth across multiple hops of the network. Timing information on data flow through the data/forwarding plane of each network node of a production network can be gathered without the use of test harnesses, injected network data, or dedicated ports.

35 Claims, 15 Drawing Sheets

(56) References Cited

U.S. PATENT DOCUMENTS

| | | | |
|---|---|---|---|
| 2005/0169190 A1* | 8/2005 | Mathieu | H04L 12/24 370/252 |
| 2008/0181112 A1* | 7/2008 | Beck | H04J 3/0632 370/235 |
| 2013/0173950 A1* | 7/2013 | Banerjea | H04J 3/0664 713/503 |
| 2013/0347103 A1* | 12/2013 | Veteikis | H04L 43/04 726/22 |
| 2014/0119193 A1* | 5/2014 | Anand | H04L 47/125 370/237 |
| 2015/0163048 A1* | 6/2015 | Turnbull | H04J 3/16 370/508 |
| 2015/0163155 A1* | 6/2015 | Beheshti-Zavareh | H04L 47/283 370/236 |
| 2015/0222516 A1* | 8/2015 | Deval | H04L 67/1029 370/253 |

* cited by examiner

SYSTEM AND METHOD FOR CONTINUOUS MEASUREMENT OF TRANSIT LATENCY IN INDIVIDUAL DATA SWITCHES AND MULTI-DEVICE TOPOLOGIES

FIELD OF INVENTION

This invention relates generally to data networking and more particularly to measurement of transit latency within network elements.

BACKGROUND OF THE INVENTION

A network element (such as a router or switch) transmits and receives network data using one or more ports of that network element. Each port on the network element has a physical link speed that limits the rate at which network data can be transmitted from that port. The network element uses one or more queues to store the network data that is to be transmitted from one of the ports of the network element. The maximum data that a queue stores is determined by the available buffer memory and a buffer configuration for the queue. When the amount of network data that is to be transmitted by one of the ports on a network element, or the overall data transmitted by a network element, is greater than the port or network element can handle within a given period, network congestion can occur, resulting in increased latency for network data propagation through the nodes on the network.

In many environments, but particularly in high performance computer networking and data center environments, it can be essential for network administrators to attain a complete understanding of network latency within and between network elements on the network. Latency on a physical link is generally constant, as link latency while data is traveling on the physical link is governed by the physics and length of the media type for that link. However, latency within each network element can be subject to substantial variability based on device architecture and prevailing network conditions. Thus, it is generally accepted that forwarding latency within a network element will vary.

Traditionally, evaluating ingress to egress latency of a given network element or interface pair is achieved through the use of an external test harness. For example, optical taps on ingress and egress can be used to feed a capture device, which compares the arrival time of copies of packets from either side of the device under test. However, while test harnesses provide a means for bench testing under artificial scenarios, such testing solutions do not scale to real-world applications where hundreds or thousands of interfaces are in use and traffic flows traverse multiple paths across a network. Alternatively, artificial test data can be generated by a network element or injected into the network by a test device and monitored to enable some form of latency measurement. However, an accurate measure of real-word latency on production networks cannot be properly determined using artificially generated network data.

SUMMARY OF THE DESCRIPTION

A system and method for continuous measurement of transit latency in individual data switches and multi-device topologies is described. In an exemplary embodiment, network data is time stamped on ingress to a network element and the propagation of the network data though the network element is timed. Such embodiment enables the network element to continuously determine real-time latency data for network elements on a production network without the use of test harnesses or artificial network data, where a production network is a network deployed in a non-test environment to process and forward customer or user data.

In one embodiment, a network element comprises a first and second port. In one embodiment, the first and second data port are coupled to a network. In one embodiment, the first or second data port may be coupled to a host or an additional network element. The first and second data ports couple to a data plane. The data plane is configured to forward network data received at the first port to the second port, and couples to a timing module to generate ingress timing data for network data that is received at the first port. The timing module within the network element is further configured to generate egress timing data for network data that is transmitted via the second port. In one embodiment, the network data may be transmitted to the network or to another locally connected device. A control plane coupled to the data plane is configured to receive the ingress and egress timing data from the data plane. In one embodiment, the control plane transmits the raw timing data to an external device for correlation. In a further embodiment, the control plane correlates the timing data and transmits latency data for the network element to an external device for data aggregation.

In one embodiment, the network element includes one or more processing units configured to perform operations to determine real-time latency within a network element. Such operations include receiving production network data at a first port of the network element, applying an ingress time stamp to the network data, and forwarding the network data to a second port of the network element. After forwarding the network data to the second port, the operations further include capturing the ingress time stamp on the network data, determining an egress time stamp for the network data, and removing the ingress time stamp from the network data before transmitting the network data. In a further embodiment, the operations additionally include generating metadata for the network data, which uniquely identify the network data and includes identifiers for the ingress and egress ports used by the network data within the network element.

In another embodiment, performance and latency data for network elements are aggregated to determine performance and latency measurements in real-time for multiple nodes within a network topology. An exemplary method for determining such data includes receiving intra-node timing data from each of a first and second node, as well as timing data from at least one intermediate node that is positioned in-between the first and second nodes. The intra-node timing data for each node includes a traversal time for network data within that node. The method further includes determining link timing data including a traversal time for each link in a path between the first, second, and intermediate node and determining a path latency for the network data using the link timing data and the intra-node timing data.

In another embodiment, a system is configured to determine latency along multiple paths within a multi-path network topology. The system includes a first node to receive production network data at a first network interface coupled to the multi-path network, select an element of the network data to sample as the element traverses the network, and forward the production network data along a link to the multi-path network. The system further includes a second node to receive the production network data at a second network interface to the multi-path network. The second node is configured to select the same element of the network data to sample as is selected by the first node. Positioned in-between the first node and the second node is an intermediate node that is also coupled to the multi-path network. Each of the first, second and intermediate nodes are configured to embed at least an ingress time stamp associated with the node within the sampled element of the network data on ingress to the node, remove the ingress time stamp on egress from the node, and report a set of timing data including the ingress and egress time stamp. The system further includes a collector node to aggregate the sets of timing data from the first, second and intermediate nodes. The collector node uses the aggregated data to determine the latency along multiple paths of the multi-path network.

For the various embodiments described, a network element includes any one or more of a router, switch, hub, bridge, gateway, or other infrastructure devices for a packet-forwarding network. Furthermore, a network element can be a physical or virtual device. Additionally, the network data includes various types of packet forwarding network data including packets, datagrams, frames, or other data types used within a packet-switched network.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
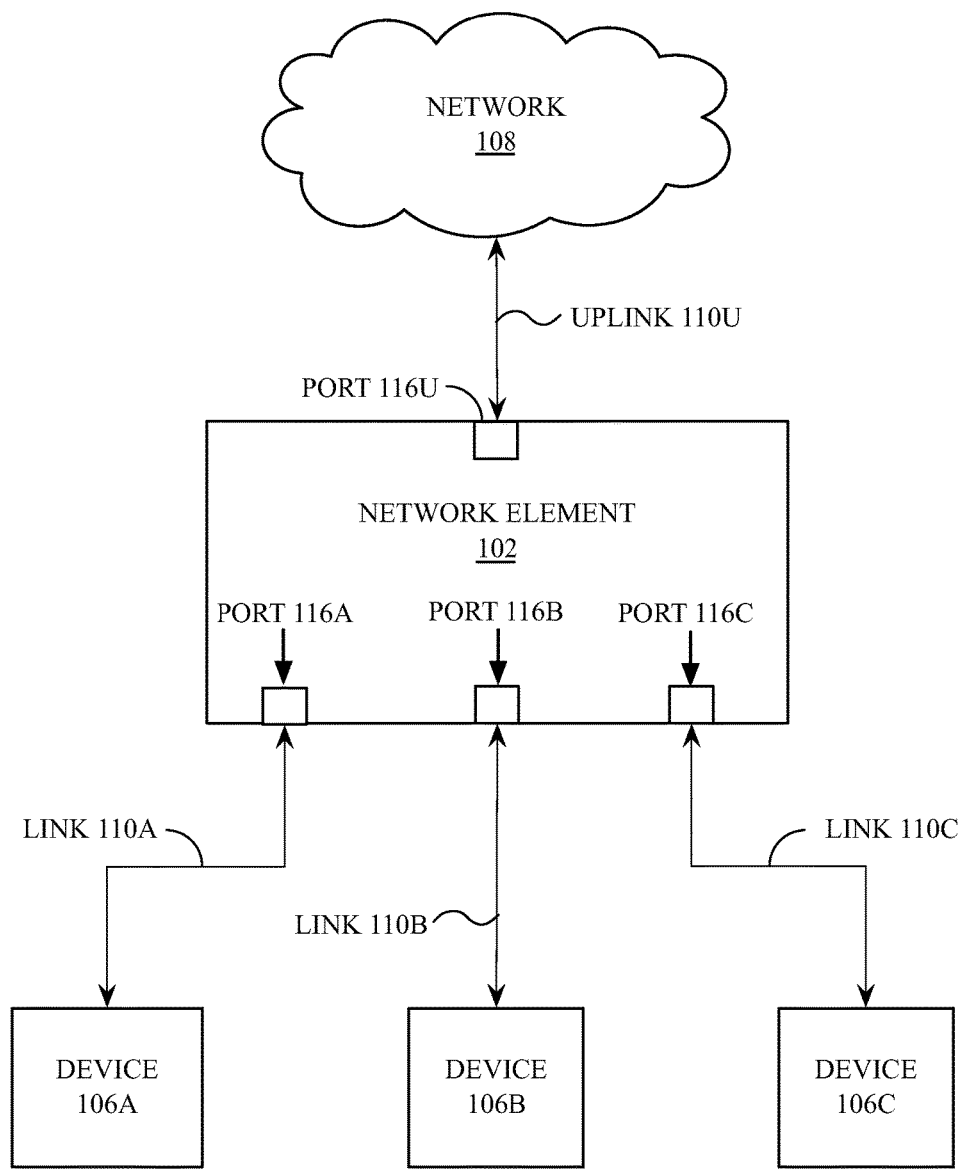
FIG. 1 is a block diagram of one embodiment of a system that includes a network element communicating network data between a network and a number of devices.

In embodiments described herein, an accurate measure of real-word latency for network data transmitted on production networks is determined by applying a time stamp to production network data on ingress to a network element and determining a traversal time by capturing the time stamp on egress from the network element. In such embodiment, time stamps applied to network data are can be removed before egress from the network element to avoid undesirable packet growth across multiple hops (e.g., network elements) of the network. These embodiments enable network managers to gather timing information on data flow through the data plane of each network node using production data on a production network and without dedicating a port of the network node to tapping network data. In this manner, embodiments enable the gathering of timing data without adversely affecting data flow within the network and without requiring production network data to include logic to generate large amounts of artificial test data.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

Embodiments of systems, methods, and associated apparatuses for the continuous measurement of transit latency in individual data switches and multi-device topologies are described herein to provide a scalable, non-intrusive mechanism for the continuous measurement of transit latency at a per-device and network topology level on production networks. The various embodiments do not require the use of test harnesses, packet duplication, or artificial data generation. Some embodiments are scalable to enable the simultaneous monitoring and measurement of latency across thousands of ports within a production network, where a production network is a network deployed in a non-test environment to process and forward customer or user data.

In one embodiment, intra-node latency data is gathered by applying a time stamp to network data on ingress to a network element. An additional time stamp can be applied to the network data within the network element after the network data is forwarded. The applied time stamps can be captured and removed from the network data before egress from the network element to avoid undesirable packet growth across multiple node hops within the network. The time stamps used may be locally relevant time stamps with a relevancy that is limited to a specific network element, or may be globally relevant time stamps based on a consistent central reference (e.g., 'wall clock' time) that is synchronized across multiple network elements within a network topology or within a region of the network topology. Where globally relevant time stamps are used, end-to-end latency within regions of a network topology can be determined using the global ingress and egress times for network data as the data traverses the topology of the network. In one embodiment, a central collector tracks the locally relevant time domain of each device and is able to present a single global time in any reporting or consolidated results.

In one embodiment, intra-node latency data for multiple network elements within a network topology are aggregated to present a global view of latency within the network. The aggregated global view provides data to enable network managers to pinpoint hotspots of high latency within the network. Additionally a multi-path analysis can be performed to determine which of multiple paths through a network topology are the highest or lowest latency paths, either in real-time or using an analysis of historical data. In one embodiment, real time or historical analysis may be determined based on a selected system configuration, or can be determined based on the local storage and processing capabilities of each node.

In one embodiment, the specific type of network data that is monitored may be tuned using the selection of one or more sampling algorithms, which select network data for monitoring based on one or more characteristics of network data flows, or the individual units (e.g., packets, frames, etc.) of network data. For example, sampling can be based upon data flow characteristics including but not limited to protocol type, origin, destination, or projected path through the monitored network topology.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network system 100 that includes a network element 102 communicating network data between a network 108 and a number of devices 106A-C. In various embodiments, the network 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

Figure 2:
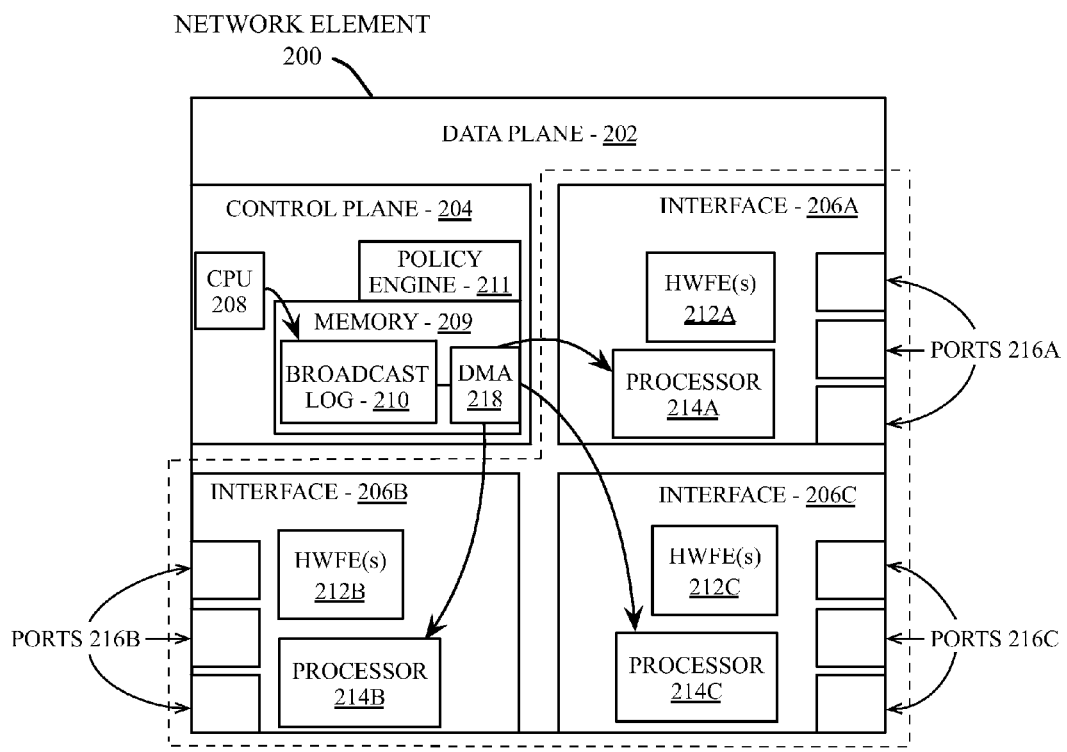
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and writes configuration data for hardware forwarding engines 212A-C in the network interface devices 206A-C. Additionally, the CPU can read data from the hardware forwarding engines 212A-C using the broadcast log 210. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C include multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, performing routing, switching, or other types of network forwarding. Each processor 214A-C can be used to accelerate various functions of the interface devices 206A-C. For example and in one embodiment, the processors 214A-C can read and write from a broadcast log 210 in the control plane 204 to program the corresponding hardware forwarding engines 212A-C. The processors 214A-C can also push data from the hardware forwarding engines 212A-C to a CPU 208 in the control plane 204 via the broadcast log 210.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C using the broadcast log 210.

In one embodiment, the memory 209 that is used to store data for the control plane 204 is shared with the data plane 202. In such embodiment a direct memory access (DMA) controller 218 is coupled to the memory 209 to allow processors 214A-C direct access to the memory 209. In one embodiment, the DMA controller 218 allows the processors 214A to directly access the broadcast log 210 without requiring the CPU 208 in the control plane 204 to send data to each processor 214A-C. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Network Element Latency Determination

Figure 3:
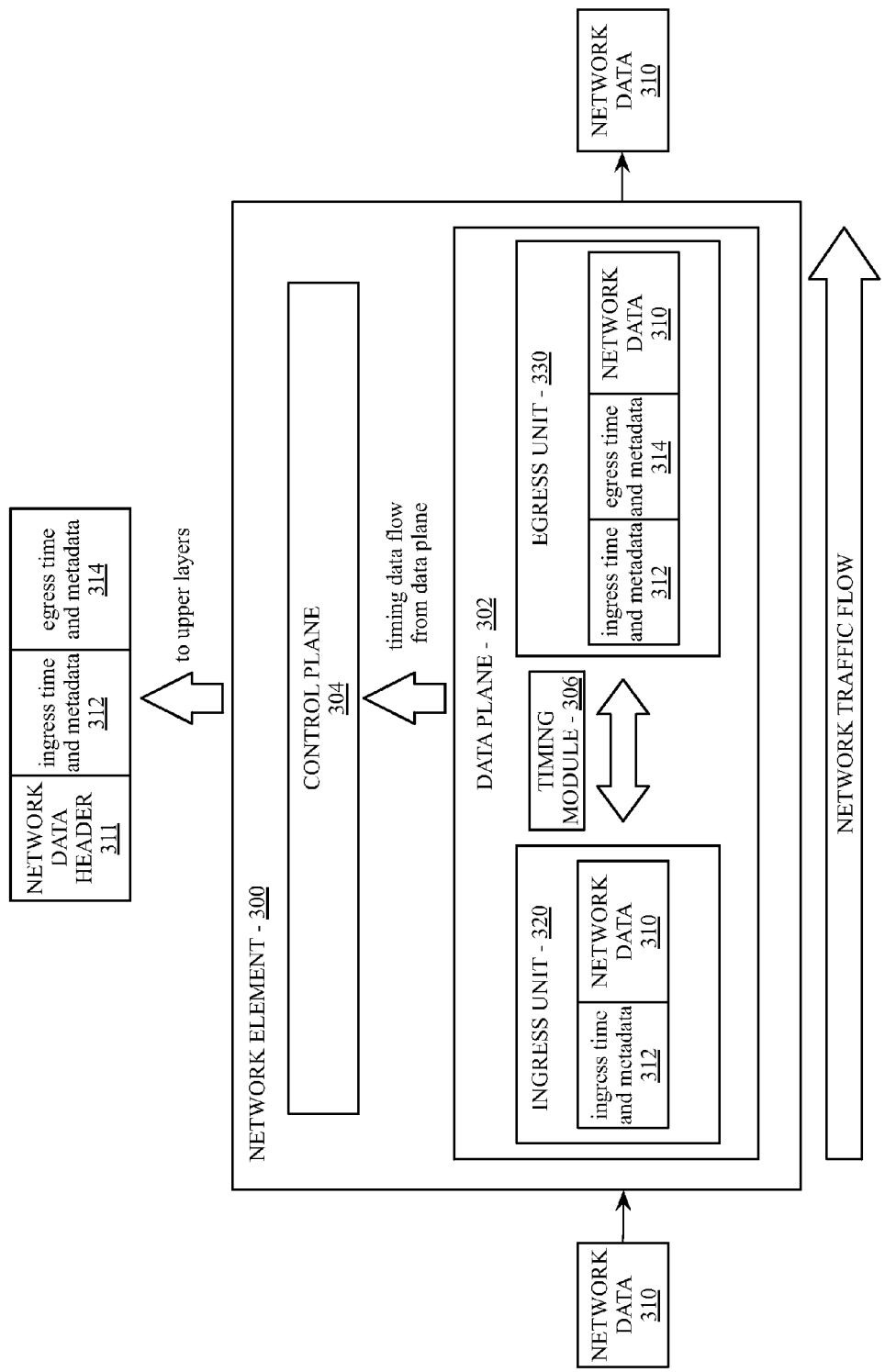
FIG. 3 is a block diagram of one embodiment of a network element configured to determine real-time latency for production network data.

FIG. 3 is a block diagram of one embodiment of a network element 300 configured to determine real-time latency for production network data 310. In one embodiment, the exemplary network element 300 is a variant of the network element 200 of FIG. 2. The network element 300 includes a data plane 302 and a control plane 304. In one embodiment the data plane includes a timing module 306 to enable the network element 300 to time the flow of network data 310. The timing module 306 can provide timing independent timing capability for both the ingress unit 320 and egress unit 330. In one embodiment, the ingress unit and the egress unit 330 each include a separate instance of the timing module 306.

In one embodiment, the timing module 306 includes a 28-bit, nanosecond granularity counter providing sufficient scope for locally relevant timing data for the exemplary network element 300. However, another type of counter may also be used to generate locally relevant timing data and the specific counter frequency and time stamp size can be adjustable based on intended use case, interface speed, and architectural details of the network element. In one embodiment, the timing module 306 includes a counter sufficient for larger scoped, globally relevant time stamps of variable timing resolution. In one embodiment, the details of the timing logic are abstracted by higher layers of hardware and software within, or associated with the network element 300.

In various embodiments, the network element 300 determines real-time latency for production network data 310 by applying, appending, or otherwise attaching an ingress time and metadata 312 to the network data 310 via an ingress unit 320. In one embodiment, additional metadata uniquely identifies units of network data 310 and conveys information about, for example, the source and destination interfaces or ports that are traversed within the network element 300 during forwarding and processing. In one embodiment, the metadata includes information on policies applied during forwarding or other actions taken on the network data, to enhance the visibility of each unit of network data 310 and provide a wider context for the analysis of data flow within the network.

For example, the metadata can include additional headers to indicate link-local or global addresses, QoS information associated with the network data 310. In one embodiment, the network data includes information regarding queuing assignments (e.g., in multi-queue hardware) used within the network element 300 for the network data 310, including for example, in network systems where the administrator may be overriding information stored within a unit of network data 310. In one embodiment, the metadata may be able to define additional information regarding source networks from which units of network data 310 originate based on knowledge of topology provided via commonly used protocols, including routing protocols or loop prevention protocols, which may be correlated by software after information for network data 310 is captured. In one embodiment, the metadata is generated by the data plane 302 after processing the unit of network data 310 on ingress to the network element 300. However, the data plane 302 need not directly generate the metadata. In one embedment, the device control plane 304 can infer equivalent information from, for example, protocol state tables.

In one embodiment, the data plane 302 determines an ingress time to apply to the ingress data unit 320 using the timing module 306 and attaches the ingress time and metadata 312, for example, when retrieving the network data from data buffers associated in the ingress port. The data plane 302 can perform network processing, apply QoS policies, or perform other operations before forwarding the ingress data unit 320 towards an egress port. In one embodiment, after determining the egress port to forward the network data, an egress time and metadata 314 is determined. In various embodiments, the egress time and metadata 314 can be applied to the network data 310 along with the ingress time and metadata 312 via an egress data unit 330. Alternatively, the egress time and metadata 314 can be reported to the control plane 304 without being appended to the network data. In one embodiment, immediately before transmitting the network data 310 via an egress port, the data plane 302 can capture any applied timing information and metadata (e.g., 312, 314) and remove the applied timing information and metadata before the network data is transmitted from the network element 300. In one embodiment, logic coupled to the egress port captures applied timing and metadata information and transmits the captured information to the control plane 304.

In one embodiment, the control plane 304 consolidates the ingress and egress time and metadata 312, 314 for report to upper layer control logic. In one embodiment, a network data header 311 for a timed unit of network data is consolidated with the ingress and egress time and metadata 312, 314 to provide the upper layer control logic additional information for use in determining latency for units of network data 310 traversing the network element 300.

Figure 4:
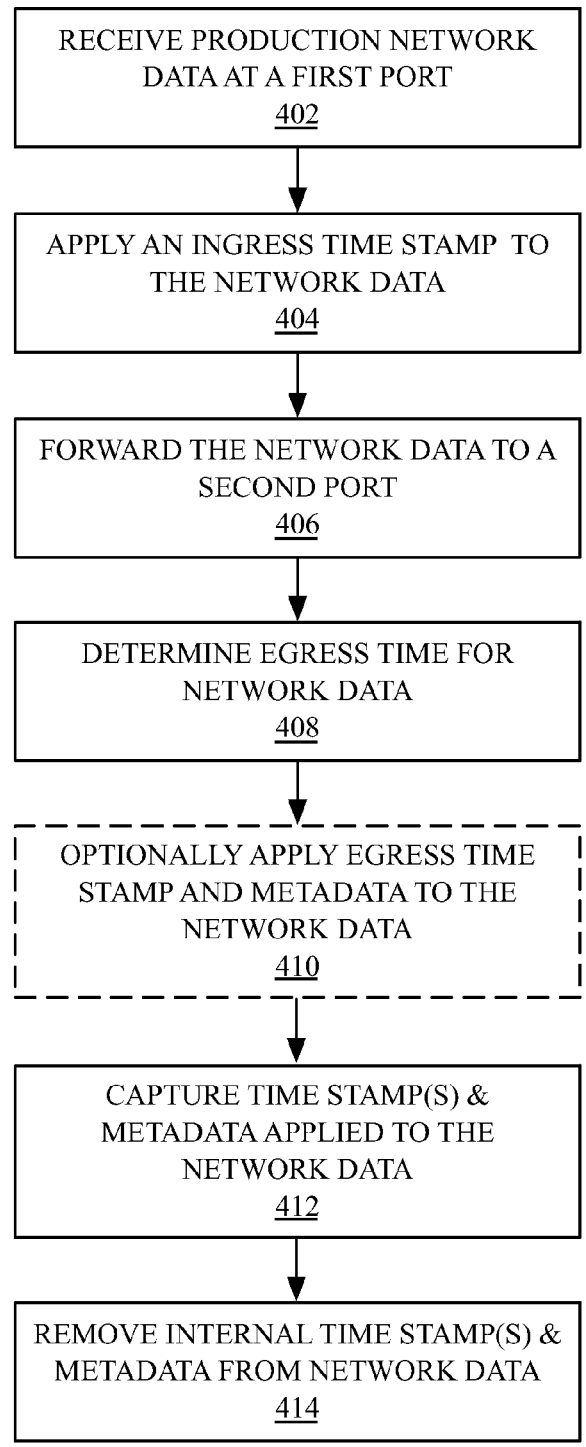
FIG. 4 is a flow diagram of exemplary logic to determine latency for network data traversing a network element, according to an embodiment.

FIG. 4 is a flow diagram of exemplary logic 400 to determine latency for network data traversing a network element, according to an embodiment. In one embodiment, logic 400 is used to determine latency for production network data. Production network data is live, real-world network data that is generated and transmitted for purposes other than testing the performance of the network. In one embodiment, as shown at block 402, logic 400 receives production network data at a first port of the network element. Logic 400 applies an ingress time stamp to the network data, as shown at block 404. In one embodiment, the forwarding logic of the network element encapsulates the network data using an internal device header and applies the ingress time stamp to a field of the internal header, allowing the network data to be time stamped without modifying the received network data. The encapsulation can be performed using a network element processor when receiving data from the port. In one embodiment, the encapsulation is performed by an application specific integrated circuit (ASIC) upon receipt if an incoming network data unit. In one embodiment, metadata can be applied or attached to the network data to, for example, uniquely identify the network data (e.g., individual network data units or data flows including multiple network data units). In addition, routing or forwarding metadata may also be applied, such as an identifier for the source port or source interface that received the network data. After the ingress timing data is applied, logic 400 forwards the network data to a second port of the network element, as shown at block 406.

In one embodiment, logic 400 determines an egress time for the network data, as shown at block 408. In one embodiment, additional metadata for the forwarded network element is also determined along with the egress time, such as destination port or interface indicators, protocol information, or other metadata that may be determined during forwarding operations in the data/forwarding plane of the network element.

In one embodiment, one or more internal headers are also available to store additional metadata, such as intermediate time stamps during forwarding, the egress time stamp, or other metadata for the network data that can be determined during or after forwarding operations. In one embodiment, as shown at block 410, logic 400 may optionally attach or apply an egress time stamp, along with additional metadata, the production network data via internal device header fields encapsulating the network data. In another embodiment, logic 400 may associate egress timing data and metadata with the traversing network data without explicitly applying an egress timestamp or egress metadata to the individual network data units. Instead, the timing data and metadata can be generated and transferred to the control plane in association with capture ingress timing data or metadata.

As shown at block 412, logic 400 can capture the ingress time stamp, along with any additional time stamps or metadata attached to the network data before, during or after performing forwarding operations in the data plane of the network element. In one embodiment, the timing data and any additional metadata captured from the network data are forwarded to the control plane for processing, or for further relay to higher levels of control, such as a centralized or regional data collector.

As shown at block 414, logic 400 removes any internal time stamps or metadata that has been applied to the network data before transmitting the network data from an egress port of the network element. This data removal can be performed automatically, for example, when buffering the network data for transmission from the egress port, although other equivalent techniques may also be used without violating the spirit of the invention as long as such techniques do not conflict with the ability to capture accurate egress timing information. In one embodiment, the data removal is performed to avoid growing the size of the individual units of network data as the network data traverses multiple hops within the network. In one embodiment, however, individual header flags applied to the network data on ingress to a network topology or specific regions of the network topology can persist within the topology or region, and are then removed on egress from the topology or region. In particular, the individual header flags may be used as marking data when performing selective sampling and monitoring of specific types of network data, or specific network data flows. Additional information on selective network data sampling is provided below in conjunction with FIGS. 11 and 12.

When applying time stamps to network data within a network element, various embodiments use one of, or a combination of locally relevant time stamps and globally relevant time stamps. Using smaller, locally relevant time stamps within each network element enables a simplified hardware implementation for the determination of intra-device latency for each node within a region of a network. While each local time stamp is relevant to the network element using the time stamp, the difference between the egress and ingress times can be used to determine internal forwarding latency for network data traversing the network element. The network elements can then transmit the per-device latency data to a central collection module or device, which creates a topology wide view of latency based on the collected and aggregated per-device latency data.

In one embodiment, at least some network elements are configured to use globally relevant time stamps that are based on a central reference, such that the timing data is consistent across the monitored region. For example, the network elements may be configured to use a regional wall clock time, or another inter-device time, including coordinated universal time (UTC), to enable time stamps that are globally relevant to the network topology, or a region of the network topology. Using globally relevant time stamps still enables intra-device, or intra-node latency determination for each hop along the network. Additionally, the globally relevant time stamps can be used to easily determine end-to-end path latency, as well as to verify per-link latency on the links between network elements. In one embodiment, the total system latency of one or more network data flows between a first and second node in a network can be readily determined using the ingress time stamp for the first node in comparison with the egress time stamp for the second node. The per-link latency (e.g., cable latency) can be determined using the egress time stamp of the first node in comparison to the ingress time stamp of the second node. Additionally, the transit latency of each node can be determined using the ingress and egress timestamp for the specific node.

In one embodiment, an application configured to receive and process network timing data from the network elements can correlate the time stamp and metadata to produce graphs and other visualizations of per-device and network wide views. In one embodiment, multiple tiers of applications consume the network-timing data that is output by the network elements.

Latency Data Analysis and Consumption

Figure 5:
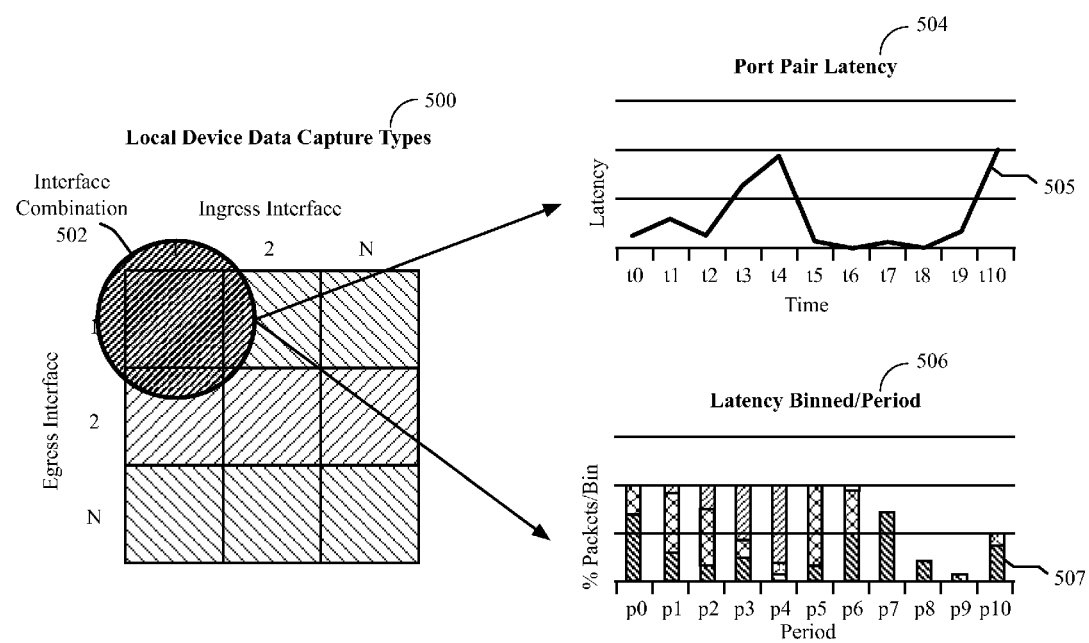
FIG. 5 illustrates exemplary local device data capture types from a network element, according to embodiments.

FIG. 5 illustrates exemplary local device data capture types 500 from a network element, according to embodiments. In one embodiment, the network elements are configured to report timing data to a local data consumer, which can be internal to the network element (e.g., in the network element control plane) or external to the network element in a central or regional data collector. In one of such embodiments, the local latency data is reported for each combination 502 of ingress and egress interfaces, although in some embodiments latency data is reported for specific ingress and egress port combinations as well. For example and in one embodiment, a port pair latency 504 is determined, which presents a graph 505 of latency for a given pair of ports over a specific time period.

The exemplary port pair latency 504 shown presents a graph 505 of latency for data both entering and exiting at a first interface (e.g., one of interfaces 206A, 206B, or 206C of FIG. 2, each interface having a set of ports 216A, 216B, or 216C). Thus, latency may be determined between ports on a single interface, or between ports on differing interfaces of a network element. In one embodiment, latency data is reported per traffic flow bins per period 506, in which a percentage of packets per bin (e.g., graph column 507 for p10) is reported for multiple periods of time for a given interface pair. In several embodiments, the latency of traffic flow bins per period graph is used to monitor the latency of different types of traffic over given periods of time.

Network data can be categorized and binned using explicit or implicit mechanisms of traffic flow analysis. For network traffic using Internet Protocol version 6 (IPv6), an explicit flow label may be present, which can serve as a hint for the network elements that multiple units of network data (e.g., multiple packets) belong to the same traffic flow. Alternatively, a flow can be defined from any combination of fields that characterize a group of network data units, such as traffic from the same source address, directed to the same destination address, having a specific protocol, or having a specific type of service (e.g., VoIP traffic, streaming video, etc.). Based on this data, a network element can assign incoming network data to one of several classes of traffic flows. The latency of such traffic flows or groups of traffic flows can then be converted to visual data via a data visualization application and presented to network administrators responsible for the monitored network elements.

In one embodiment, specific flows may be automatically and dynamically chosen for visibility based on certain control plane applications, or a network manager may directly select flows for visibility. While specific applications may require knowledge of every packet within a given flow, it may not be necessary to sample each network data unit within a flow. In one embodiment, control plane applications may select specific types of network data that is known to traverse a broad array of network links (e.g., an ARP packet in a Layer 2 Ethernet network).

Figure 6:
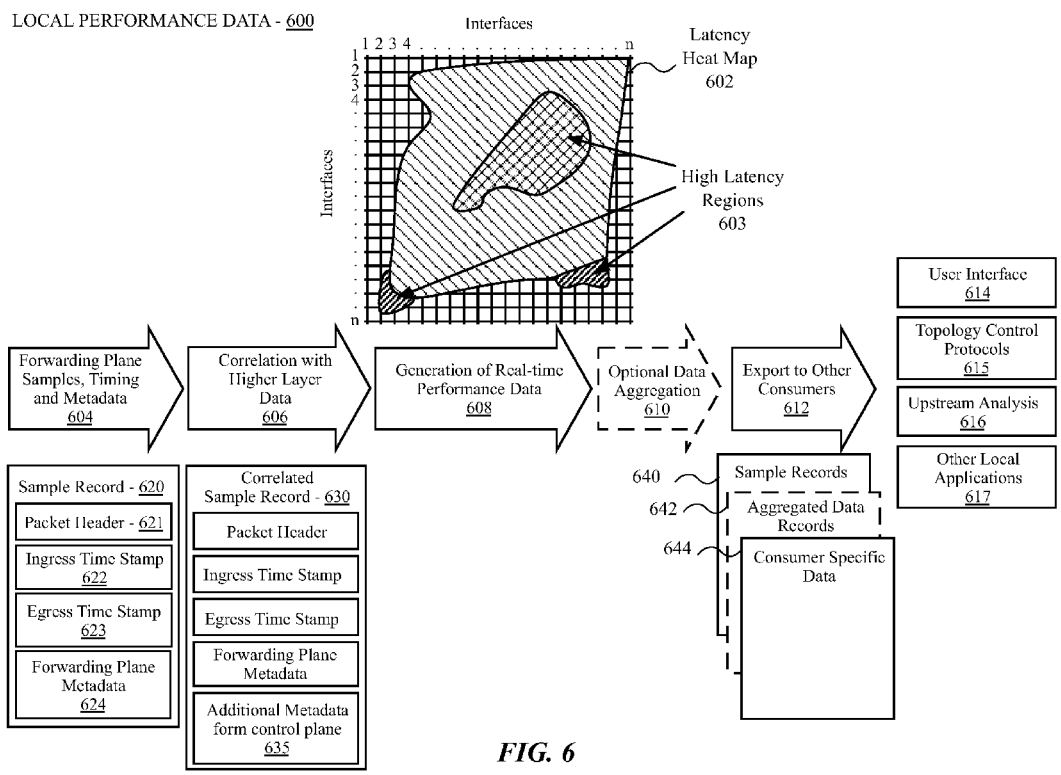
FIG. 6 is an illustration of consumption and export of local performance data from a network element, according to an embodiment.

FIG. 6 is an illustration of consumption and export of local performance data 600 from a network element, according to an embodiment. In one embodiment, local performance data 600 can be consumed and processed to create visualizations of performance and latency within a network element or groups of network elements. For example, each monitored network element can have a number of ports, or a number of interfaces each having a number of ports. In one embodiment, the latency data is processed by a data consuming application to generate a latency heat map 602, which presents a visual indication of high latency regions 603 within a monitored network element. In various embodiments, the data processing applications execute within the control plane of network elements, within central data collectors on the network, or on data processing systems coupled to the network configured with network monitoring software that receives performance data from the network elements or from the central collectors.

In one embodiment, a collector (e.g., a control plane collector) receives forwarding plane samples 604 including timing and metadata from the forwarding or data plane of a network element. An exemplary sample record 620 includes a packet header 621 (e.g., network data header 311 in FIG. 3), an ingress time stamp 622, an egress time stamp 623, and any additional forwarding plane metadata 624 collected and reported by the data/forwarding plane of the network element.

The collector can then perform data correlation 606 with higher layer data that is determined on the device/control plane, or received from external sources. For example, a correlated sample record 630 can include additional metadata 635 that can be determined on the control plane of a network element, for example, based on protocol state table analysis. In one embodiment, a collector uses correlated data to generate real-time performance data 608 for production network flows within monitored network elements. The real-time performance data 608 is used in some embodiments to generate real-time performance mapping data than is visualized and presented via network monitoring software. The collector can optionally perform additional data aggregation 610 to further process the local performance data 600. The real-time performance data 608 and any additionally aggregated data 610 is then exported to other consumers 612.

The exported data includes one or more groups of sample records 640 (e.g., one or more of a sample record 620 and/or correlated sample record 630), aggregated data records 642 from the optional data aggregation 610, an any consumer specific data 644 that is created by the local consumer, or intended for specific use by one or more other consumers. In one embodiment the export protocol used to export data is extensible to accommodate the multitude of network performance data and metadata that could be generated from network elements of different capabilities and operating on different network protocols.

In some applications there may be a benefit to avoiding localized correlation and reduction of data to ensure upstream collectors have the maximum amount detail from each source. Such collectors may then select certain types of data to discard. However it is also possible for a network manager to choose to filter certain data or metadata to certain target collectors based on a specific capability or purpose of each collector. The other consumers, in various embodiments, include a collector user interface 614 that presents visualizations of the performance data, or enables the tuning or modification of the performance data (e.g., enable/disable data collection, configure traffic flow or data unit sampling, configuring data export protocols, etc.), topology control protocols 615 to configure, for example, a virtual network configuration within a network topology, or higher layer collectors configured for upstream analysis 616 of network performance data. In one embodiment, data is exported to other local applications 617 that operate in parallel with the exemplary local consumer illustrated, for example, to perform other local level data analysis.

Figure 7:
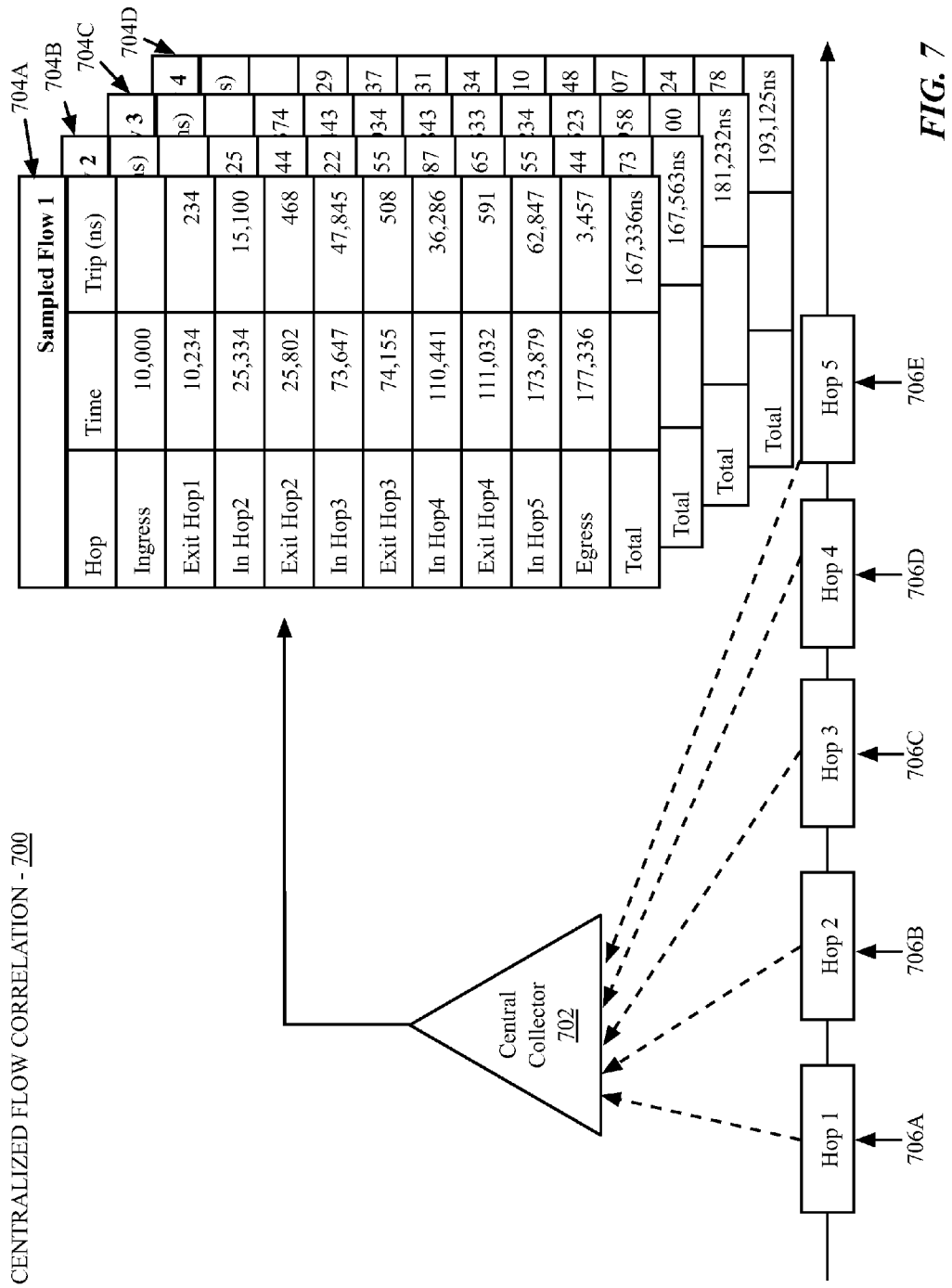
FIG. 7 is an illustration of centralized flow correlation for traffic flows along a specific path, according to an embodiment.

FIG. 7 is an illustration of centralized flow correlation 700 for traffic flows along a specific path, according to an embodiment. In one embodiment, the exported timing data enables a centralized determination of latency data for multiple types of traffic flows within the network topology. A central collector 702 receives timing data for each hop (e.g., hop 1-5 706A-E) along a specified network path. Each hop in the path represents a network element that is traversed by network data associated with the traffic flow. For the sampled flows 704A-D, hop 1 706A is the ingress network element for the monitored topology or region of a monitored topology, while hop 5 706E is the egress network element through which the sampled flows 704A-D exit the monitored region or topology.

In one embodiment, timing data for sampled flows is gathered using globally relevant timestamps that enables the determination of timing data both within and between nodes along the flow path. For example, a unit of network data in first sampled flow 704A is reported as entering the monitored region at time 10,000 at hop 1 706A and exits the first hop in the path 234 nanoseconds (e.g., $234 \times 10^{-9}$ seconds) later at time 10,234. Using globally relevant timestamps, it can be determined that the network data unit in sample flow 1 704A has a link transit time of 15,100 nanoseconds (e.g., 15.1 microseconds or $15.1 \times 10^{-6}$ seconds), which is generally deterministic based on the type and length of the physical medium within the link. Accordingly, the central collector 702 can correlate the trip time for each node and link to determine overall path latency (e.g., total trip time) for each of the sampled flows 704A-D and extrapolate fixed latency costs (e.g., based on physical media measurements).

In one embodiment, each of the sampled flows 704A-D are differentiated based on certain characteristics common to network data within the traffic flow, such network data units between a specific source to a specific destination, or within a multicast group or broadcast domain. Alternatively, traffic flow differentiation can be based on a specific set of network data (e.g., packets of a specific protocol) that traverses a specific node within a specific time interval. As illustrated by the total trip time for each of the exemplary sampled flows 704A-D (e.g., 167,336 ns, 167,563 ns, 181,232 ns, and 191,125 ns respectively) network data within different traffic flows can have different end-to-end latency along the same path through the network. In one embodiment, gathering and reporting the latency data for network data within different traffic flows allows network administrators to validate QoS configurations for network elements within a path and detect any misconfigured network elements that are not applying proper QoS criteria.

The latency data shown for sampled flows 704A-D is exemplary, and additional dimensions of data may also be generated. For example, sampled flows may be defined based on characteristics of the network data that are relevant externally to the sampled network (e.g., hop 1-5 706A-E). For example, latency data may be generated based on a source-destination tuple over a period of time, in which a sampled flow is defined for units of network data from remote source networks, or for network data that is destined to remote destination networks. For example, a sampled flow can include network data from a specific source network that is some number of hops upstream from hop 1 706A and/or network data that is destined to a specific destination network that is some number of hops downstream from hop 5 706E. In other words, sampled flows may be defined using network data characteristics beyond those that are relevant to the timing enabled network topology to infer wider patterns of network performance.

Figure 8:
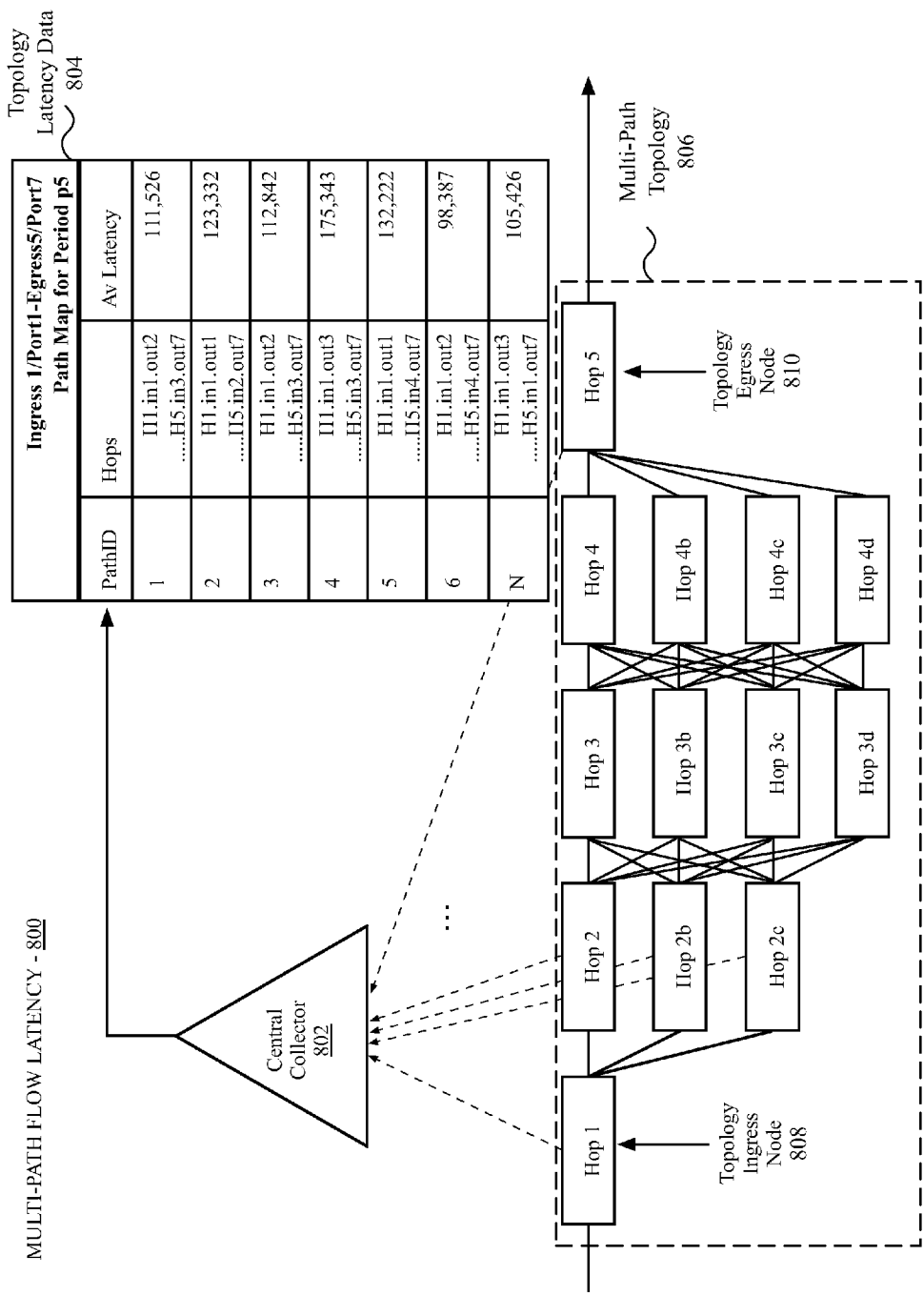
FIG. 8 is an illustration of multi-path flow latency within a network topology, according to an embodiment.

FIG. 8 is an illustration of multi-path flow latency 800 between a pair of nodes within a network, according to an embodiment. In one embodiment, a central collector 802, which can be the same or different from central collector 702 of FIG. 7, consumes latency data to generate a chart of latency data 804 over a specified period for multiple paths between two nodes within a multi-path topology 806. In this embodiment, each of the multiple paths between an ingress node 808 (e.g., hop 1) and an egress node 810 (e.g., hop 5) can be measured for latency using aggregated latency data and the latency data along each path can be correlated and aggregated to determine an average latency for each path. In one embodiment, latency data for each network element and link along the path can be determined and reported graphically.

Additionally, the determined latency data can enable network administrators to verify configured paths for data within the multi-path topology 806. For example, the exemplary topology latency data 804 shows a first path having a path ID of 1 beginning at the network element of hop 1 (e.g., the topology ingress node 808), entering the network element at interface 1, exiting the network element at interface 2 (e.g., toward hop 2b), and ultimately proceeding, for example, through hop 4C before arriving at interface 3 of the network element at hop 5 before egressing the egress node through interface 7 of the network element at hop 5. A network administrator can use the path data to determine if the detected path for any classes of traffic flow differs from any pre-configured paths for those data classes in addition to detecting network congestion within the multi-path topology 806 in real time.

In one embodiment, the latency data 804 reports an average end-to-end latency for all network data through path 1 (e.g., 111,526 nanoseconds). In one embodiment, the average end-to-end latency of network data traversing the path is updated and reported in real time as network conditions along the path change, or the sample period for each path is adjusted. While in one embodiment, data along each path is transported using the same protocol, in alternate embodiments, different paths can transports the data with different protocols and/or different quality of service parameters. In addition to real time reporting, in one embodiment the central collector 802 also provides support for historical network latency reporting based on stored information. Additionally, network elements may be configured to provide historical network latency information to the central collector 802. In one embodiment the degree to which real time or historical information is provided by a network element may vary based on the local storage and processing capabilities within each element.

The latency data 804 shown is exemplary, and additional dimensions of data may also be generated. For example, latency data may be generated a source-destination tuple over a period of time. In one embodiment, based the metadata available to a reporting network element (e.g., ingress node 808, egress node 810) or a collector (e.g., central collector 802) latency data can be determined for network data from remote source networks, or for network data that is destined to remote destination networks. For example, in one embodiment the central collector 802 can determine that network data arriving at the ingress node 808 originated from a specific remote subnet, where some percentage of the remote source subnet data arrives at a first port or interface, while a second percentage of remote source subnet data arrives at a second or third port or interface. In one embodiment the central collector 802 can determine a percentage of network data from the remote source subnet that is destined for a specific remote destination subnet, including determining performance data for network data from specific source and destination subnets when the network data takes multiple paths through the multi-path topology 806. For example, some percentage of the network data from the remote source subnet may take a first path through the multi-path topology 806, while a second percentage of network data from the remote source subnet may take a second path through the multi-path topology 806, ultimately to arrive at the same remote destination subnet. Accordingly, topology latency data 804 may be used to determine wider patterns of network performance beyond the sampled network, as a set of flows may have the same ingress and egress points but may be associated with different applications, protocols, or different source and destination networks depending on the devices that are connected to an ingress/egress node.

Figure 9:
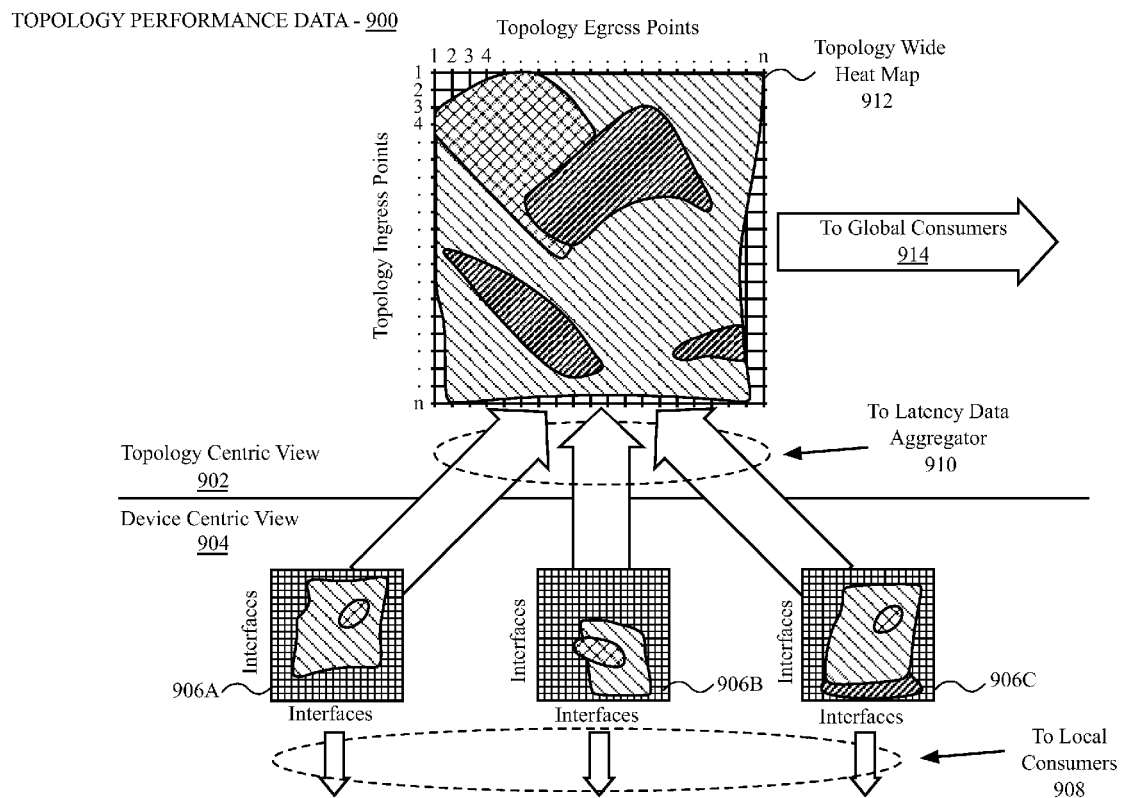
FIG. 9 is an illustration of generation, consumption, and export of topology performance data at a per-device and topology centric level, according to an embodiment.

FIG. 9 is an illustration of generation, consumption, and export of topology performance data 900 at a per-device and topology centric level, according to an embodiment. In one embodiment, a consumer of latency data can configure data generation and visualization for a topology centric view 902 and device centric view 904. For example, the exemplary device centric view 904 includes latency data and data visualizations (e.g., heat maps 906A-C) for interface pairs on multiple network elements. The latency data generated is exported 908 to other local consumers at each individual device level and is also transmitted 910 to a latency data aggregator to generate data and visualizations in the topology centric view 902. For example a topology wide heat map 912 showing latency for paths beginning and ending at various topology ingress and egress points. The topology centric data can be further export 914 to global consumers. For example, discovery and determination of multi-path flow latency 800 can be performed as shown in FIG. 8, and such data can be exported 914 to global consumers for further analysis, processing or visualization. Such data may be used, in one embodiment, to drive external 'controllers' that influence forwarding decisions within the topology. For example, routing metrics may be changed to perform one path over a different path due to underutilization or reduced latency along a specific path.

Figure 10:
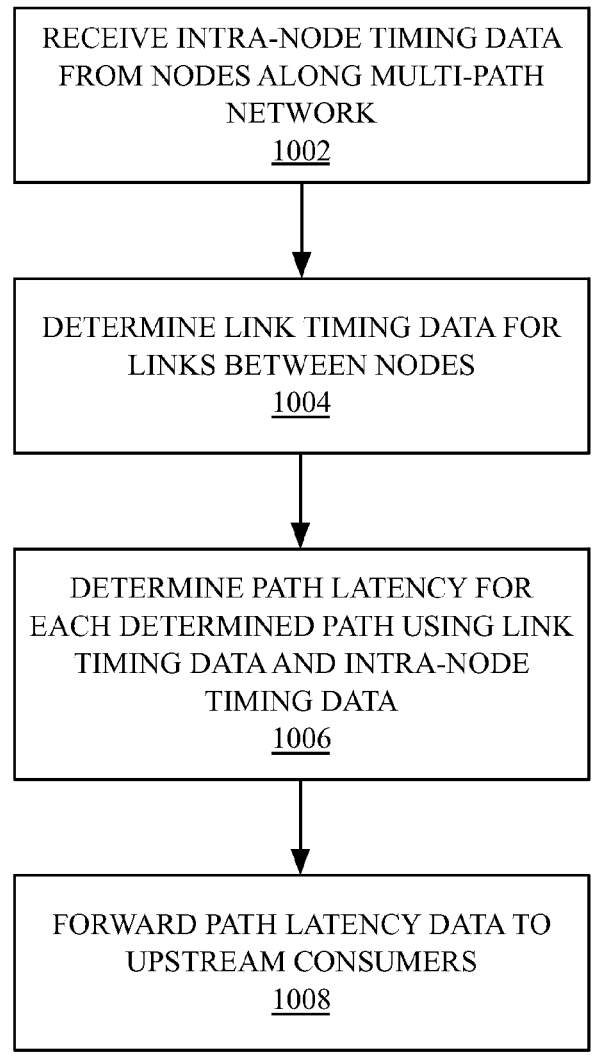
FIG. 10 is a flow diagram of exemplary logic to perform topology centric analysis of latency data, according to an embodiment.

FIG. 10 is a flow diagram of exemplary logic 1000 to perform topology centric analysis of latency data, according to an embodiment. In one embodiment, a central collector, such as the central collector 802 as described in FIG. 8, performs logic 1000. In one embodiment, logic 1000 receives intra-node timing data from one or more nodes along a multi-path network, as shown at block 1002. Based on the received data, logic 1000 determines link-timing data for links between nodes, as shown at block 1004. In one embodiment, this data can be used to dynamically discover paths through the network topology. Logic 1000 determines a path latency for each determined path using link timing data and intra-node timing data, as shown at block 1006.

In one embodiment, the resolution of the path determination is based on the number of nodes having network elements that report latency data. If each node along the path includes a latency reporting network element, each path through the network topology can be discovered. However, using network data flow analysis, at least a partial determination of the multiple paths can be determined based on metadata and packet header information reported with timing data from the topology edge nodes. Moreover, using an absolute time that is globally relevant across all monitor nodes enables the end-to-end latency for multiple paths to be determined using only the edge nodes of each path. Accordingly, in one embodiment, only the ingress nodes for a topology have network elements that report latency data. Once the latency data is determined for the multiple paths, logic 1000 forwards the path latency data to upstream consumers of the data, as shown in block 1008.

Network Data Sampling and Selection

In one embodiment, the timing is performed in parallel on the interfaces of the network elements within a monitored topology to attain the greatest determinism and accuracy. However, engineering and manufacturing costs may dictate the use of less performing solutions, as the control plane and data/forwarding plane for devices having certain target applications may not have sufficient processing power to capture and correlate timing data for all traffic flowing through the network element. For example, it may be impractical to time all data traversing network elements used in Internet backbone connections, or other extremely high throughput connections. Alternatively, the additional data and control plane logic required to determine latency for all network data may not be suitable network elements used in less complex network installations. To enable latency data determination across a wide range of target applications, some embodiments include mechanisms to enable the selection and sampling of a sub-set of network data that traverses a network element or a monitored, timing capable network topology.

In one embodiment, a percentage of the network data (e.g., 1 in N packets or frames) through a network element is selected for sampling and monitoring using one or more sampling algorithms. Exemplary sampling algorithms include sFlow, Internet Protocol Flow Information Export (IPFIX), or Sampled Netflow, although the precise sampling algorithm used varies among embodiments. In each embodiment, the sampling algorithm is configured to gather a representative sample of traffic types. The representative sample can be selected using considerations such as selecting network data that will egress across a wide range of ports or interfaces of each network element, selecting data having sufficient header entropy to ensure the sampled data is load balanced across multiple paths of a multipath environment, selecting network data units across a range of sizes, and selecting network data belonging to both short lived and long lived traffic flows. In one embodiment, the selection algorithm operates independently on each ingress port of the network interface to maximize sampling effectiveness.

In one embodiment, the sampling algorithm uses deterministic sampling, such that the same units of network data are deterministically sampled. Deterministic sampling enables multiple network elements to sample the same units of network data, allowing latency determination for sampled units of network data as the data flows through the timing capable topology. For example and in one embodiment, if deterministic sampling is used for network data transported along a path, timing data for the same subset of network data is gathered at each network element in this path. This allows for determination of a path latency without marking network data while the data is transported on the interconnecting links. In one embodiment, the sampling algorithm is applied on interfaces facing outside of a timing capable topology and the sampled units of network data are non-intrusively marked to allow downstream network elements to identify and time the sampled network data as the network data units traverse the timing capable topology. Embodiments making use markers on sampled network data can significantly reduce the complexity of matching logic on downstream network elements when performing network data sampling.

Figure 11:
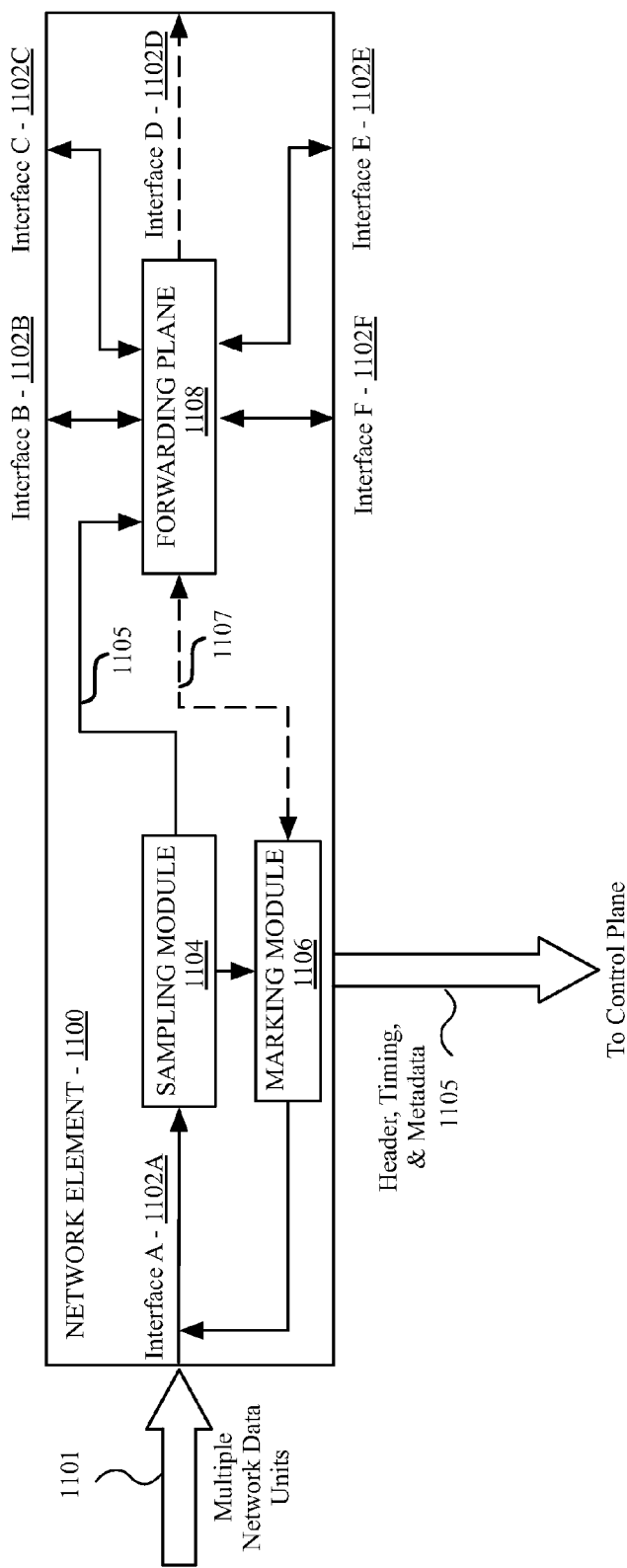
FIG. 11 is a block diagram of a network element configured to sample a subset of incoming network data, according to an embodiment.

FIG. 11 is a block diagram of a network element 1100 configured to sample a subset of incoming network data, according to an embodiment. The network element 1100 includes multiple network interfaces (e.g., Interface 1102A-F) for receiving and transmitting network data. The network element 1100 additionally includes a sampling module 1104, a marking module 1106, and a forwarding plane 1108 to forward network data between the various interfaces 1102A-F. In one embodiment, the network element 1100 is configured as an edge node for a timing capable topology, in which interface 1102A includes an uplink port that transits network data into and out of a monitored region of the network topology. In such embodiment, interface 1102A is configured to pass incoming data through the sampling module 1104, which determines which of the incoming data units to select for monitoring. In one embodiment, a marking module 1106 marks the selected network data units before the marked data units 1107 are transferred to the forwarding plane 1108. In such embodiment, unmarked network elements 1105 bypass the marking module 1106. For network data units exiting the monitored region of the network topology though interface 1102A, marked data units 1107 can have any applied markings removed before egress from the region through interface 1102A.

In one embodiment, the network element 1100 additionally includes timing modules and logic as shown in FIG. 3. In such embodiment, metadata 1105 such as a data unit header, ingress and egress timing data, and other metadata is transmitted to the network element control plane, enabling the construction of a real time view of the transit of a given network data unit (e.g., packet, frame, datagram, etc.) through the network. While network data marking is shown, in one embodiment, sampled units of network data are not marked, and each downstream node from the network element employs a deterministic sampling algorithm that samples the same units of network data through each node of the topology.

Alternatively for certain applications with known traffic types and patterns, it is sufficient to measure transit latency for specific, well known types of network data or data flows, rather than using sampling or monitoring all traffic. In one embodiment, nodes of a timing capable network topology selectively matches network data units based on well-known fields in headers or by using general pattern matching or bit masking. In some embodiments, pattern matching network data having specific characteristics provides a reasonable subset of traffic flows that are expected to cross a monitored topology. For example, network elements employed in a network that uses the Transmission Control Protocol/Internet Protocol (TCP/IP) can be configured to sample all TCP protocol SYN packets directed to the media access control (MAC) address of a local router, to gain a representative sampling of network data that crosses the network topology.

Figure 12:
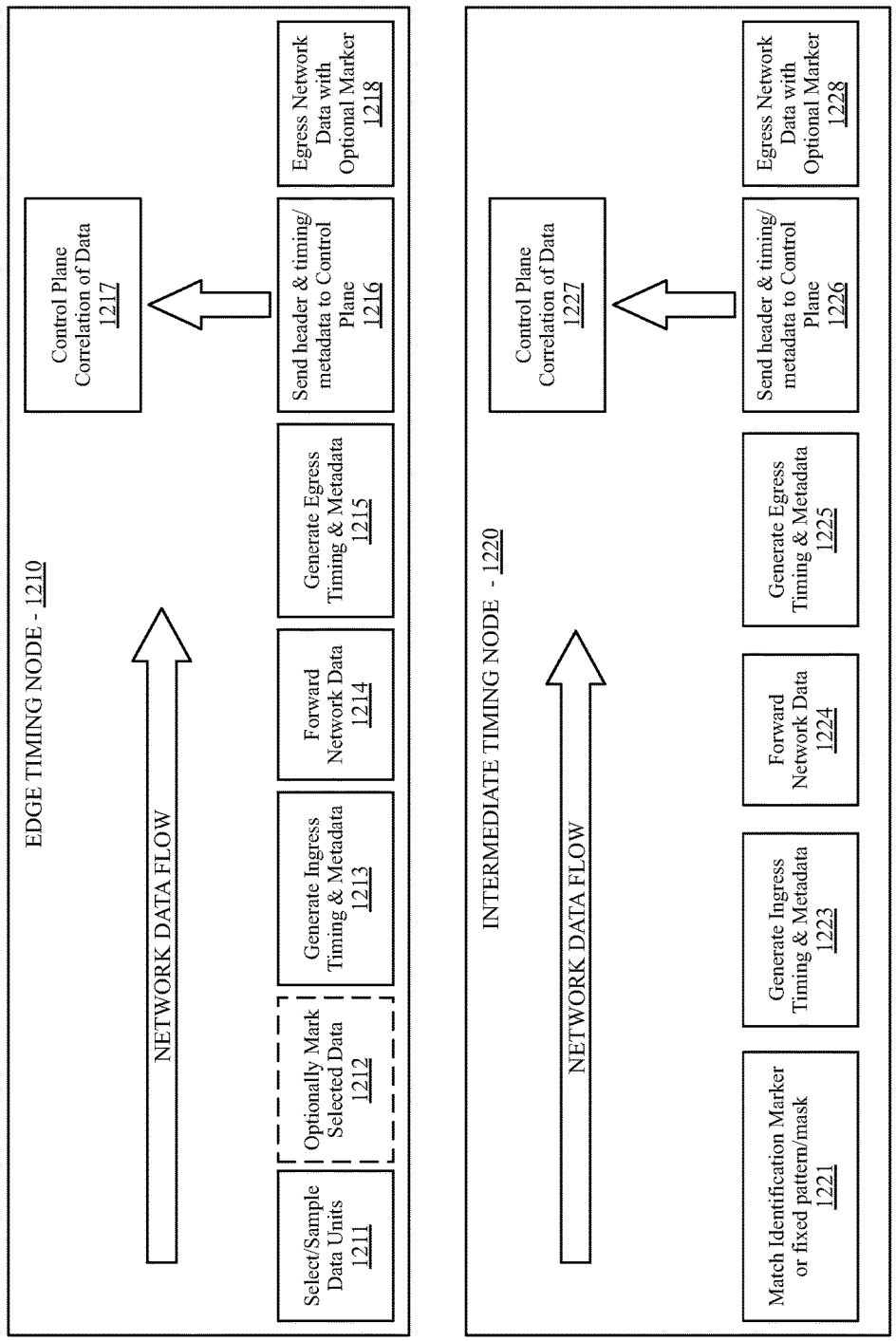
FIG. 12 is a block diagram of network data flow through exemplary edge and intermediate timing nodes within a network topology, according to an embodiment.

FIG. 12 is a block diagram of network data flow through exemplary edge and intermediate timing nodes within a network topology, according to an embodiment. An edge timing node 1210 and intermediate timing node 1220 are illustrated. In one embodiment, the edge timing node 1210 is configured to select or sample network data units (e.g., packets, frames, etc.) using one or more sampling algorithms known in the art, a tuned sampling algorithm, or using fixed pattern matching or bit masking to select network data units having known traffic types, characteristics, or patterns. For example, the edge timing node 1210 and intermediate timing nodes 1220 can be configured to time all units of network data matching a specific data pattern (e.g., all or a specific fraction of TCP SYN packets directed to a router, having a specific QoS characteristic, within a traffic flow based on source and destination or having a specific flow label, etc.).

The edge timing node 1210 can optionally mark the selected network data unit, or each unit of a selected data flow at block 1212. The marking mechanism can vary amongst embodiments and may be user configurable. In one embodiment, a reserved or unused header within the selected network data unit is modified in a non-intrusive manner. In one embodiment, protocol specific data is monitored, and a specific field within a protocol header of the network data can be marked to indicate to downstream timing nodes that the marked data is to be timed or monitored. For example, the hop-by-hop options header for data using the IPv6 protocol can be configured with a data marking that signals each downstream node to time the forwarding latency of the selected IPv6 packet. The option type identifier for the timing marking in the hop-by-hop header can be configured such that any network element that is not timing enabled will simply ignore the marking and continue processing the marked packet. Other suitable protocol specific headers may also be used in various embodiments.

As with network element 300 of FIG. 3 above, the edge timing node 1210, having selected and optionally marked specific network data units at block 1211 and 1212, generates ingress timing & metadata at block 1213 before forwarding network data at block 1214 and generating egress timing & metadata at block 1215. One or more headers from the network data (e.g., internal headers, protocol headers, etc.) are sent to the control plane at 1216. As shown at block 1217, the control plane correlates the data and optionally generates latency data and transmits the available latency data to higher level consumers, or transmits the raw timing data and metadata to higher level consumers for correlation, processing, and aggregation. In one embodiment, final egress timing data is not available at the control plane until the network data unit egresses. However, in one embodiment intermediate timing data may be generated when the network data is forwarded. At block 1218, the edge timing node 1210 egresses the network data having the optional marker into the timing enabled topology and final egress timing data for the network data unit can be determined.

Within the timing enabled topology, each intermediate node (e.g., intermediate timing node 1220) can examine network data traversing the node to identify units of network data that are to be timed or monitored. At block 1221, in one embodiment, network data units may be selected using the same deterministic sampling algorithm used at block 1211 in the edge timing node 1210. In one embodiment, at block 1221 each network data unit having the identification marker applied by the edge timing node 1210, matching a specific fixed pattern or bit mask, having specific characteristics, or belonging to a specific traffic flow, is selected for timing. For the selected network data units, the intermediate timing node 1220 generates ingress timing & metadata at block 1223, forwards the network data at block 1224, generates egress timing & metadata at block 1225, and sends one or more portions of header & timing data or metadata to the control plane 1226. In one embodiment, while intermediate timing data may be generated after a network data unit is forwarded, final egress timing data for a network data unit is not determined until egresses from the timing node. At block 1227, the control plane correlates data in a similar manner as in block 1217 with respect to the edge timing node 1210. At block 1228, the intermediate timing node egresses the network data and propagates any optional markers to the next hop within the network topology. As discussed with respect to the marking module 1106 of FIG. 11, applied markers for the network data may be removed on egress form the timing capable topology depending on the manner of marking selected.

Figure 13:
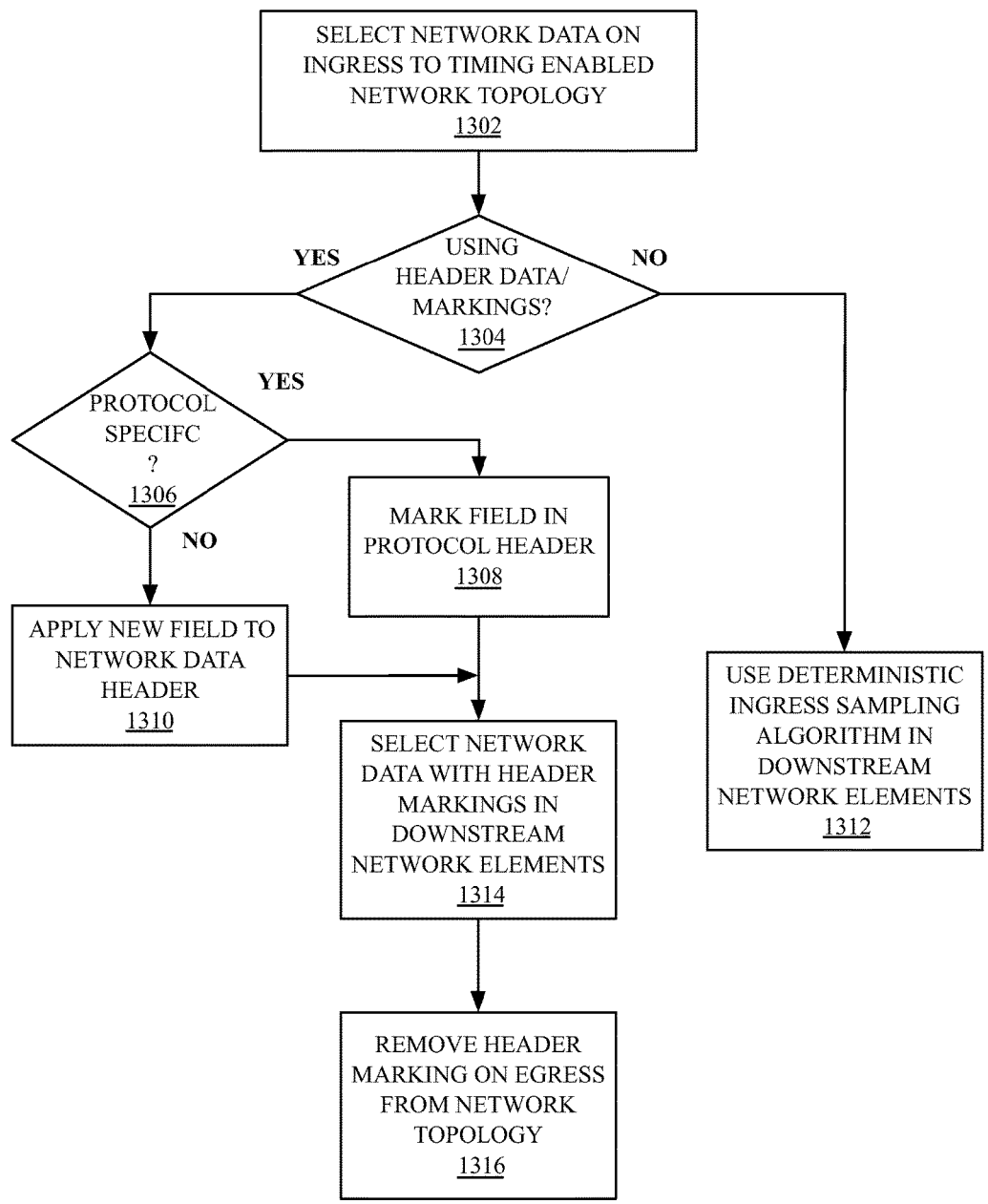
FIG. 13 is a flow diagram of exemplary logic utilized when timing a subset of network data through a timing enabled topology, according to an embodiment.

FIG. 13 is a flow diagram of exemplary logic 1300 utilized when timing a subset of network data through a timing enabled topology, according to an embodiment. In one embodiment, logic 1300 is performed by a system of interconnected network elements within a timing enabled network topology. In one embodiment, as shown at block 1302 and discussed in FIGS. 11-12 above, logic 1300 selects network data on ingress to the timing enabled network topology based on an ingress sampling algorithm or selection method. If the network elements within the topology are not configured to use header markings, as determined at block 1304, logic 1300 uses the same deterministic sampling algorithm used at ingress to the topology for each downstream network element, as shown at block 1312, such that the same units are deterministically selected for timing. Alternatively, logic 1300 can be configured to time network data having certain characteristics at each hop within the timing enabled topology. For example, each network element can be configured to time all network data belonging to a specific category or having specific characteristics, (e.g., a specific IPv6 flow label, IPv4 differentiated services code point (DSCP) value, QoS category, etc.).

If, at block 1304 logic 1300 determines that the topology is configured to use header markings, the network element can determine if the marking or sampling is configured in a protocol specific manner at block 1306. This determination may be based on a manual configuration at each hop, or may be communicated via in-band or out-of band discovery protocol used to share capabilities between devices (e.g., link layer discovery protocol (LLDP), etc.). For example, all or a subset of TCP/IP or UDP traffic through the topology can be sampled. In such configuration, at block 1308 the network element can mark a specific field in a specific protocol header. If at block 1306 the selection characteristics determined to not be protocol specific, in one embodiment, the ingress network element can apply a new field to the network data header, as shown at block 1310. In one embodiment, the new field is a topology specific field to be used within the timing enabled topology.

Once an appropriate header marking is applied at one of block 1308 or block 1310, the network data egresses network element serving as an edge node to the timing enabled topology. Subsequently, each downstream network element along the traversed path of the network data unit selects network data units having markings that indicate the network data unit has been selected for timing. The network data units are timed at each node along the traversal path through the timing enabled topology until in one embodiment, as shown at block 1316, the applied header markings are removed from the network data units on egress from the timing enabled network topology. In one embodiment, the timing enabled network topology can be configured into multiple regions, where each region of the topology can be configured to use different selection or marking mechanism. In such embodiment, logic 1300 illustrated in FIG. 13 can be applied for each transition into and out of each region within the timing enabled network topology. Additionally, while logic 1300 describes the use of sampling algorithms to select network data on ingress to the timing enabled network topology, in one embodiment manual selection of network data may be performed based on characteristics of the network data. For example, a network administrator may specify characteristics of network data to sample based on source or destination information, or some other header information within the network data.

Figure 14:
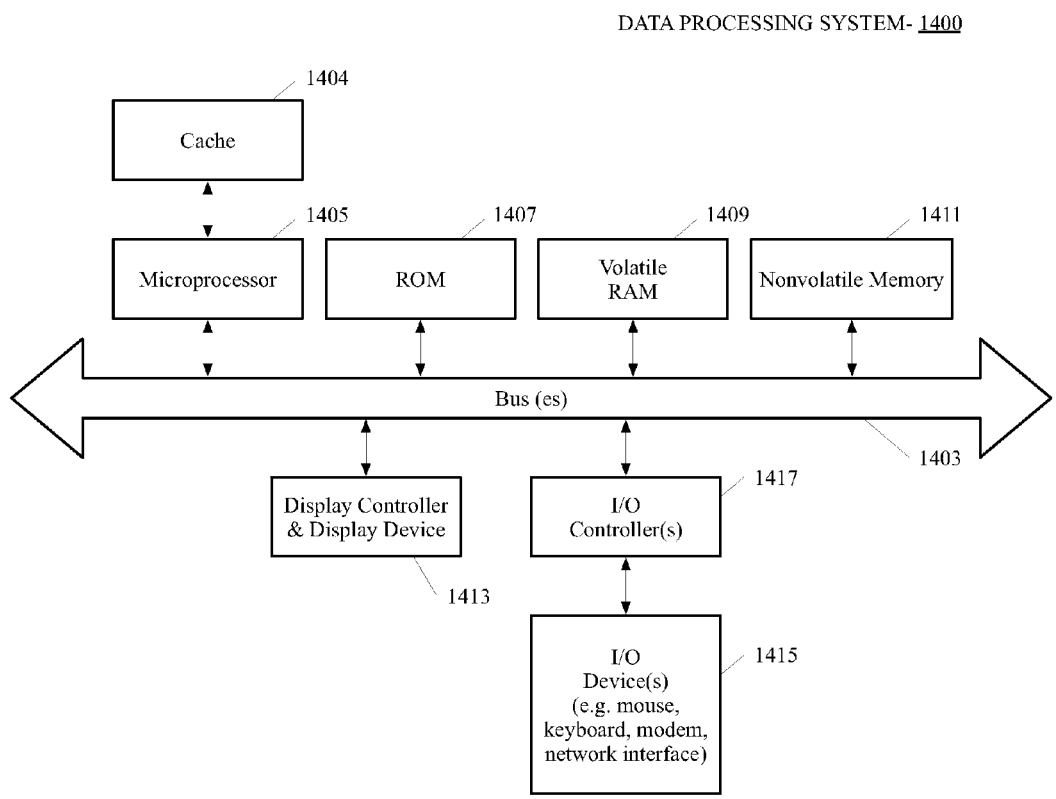
FIG. 14 shows one example of a data processing system, which may be used with one embodiment of the present invention.

FIG. 14 shows one example of a data processing system 1400, which may be used with one embodiment of the present invention. For example, the system 1400 may be implemented including one or more of network element 102 as in FIG. 1, network element 200 as in FIG. 2, or network element 300 as in FIG. 3. Note that while FIG. 14 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 1400 includes one or more bus(es) 1403 which couple to one or more microprocessor(s) 1405, ROM (Read Only Memory) 1407, volatile RAM 1409 and a non-volatile memory 1411. The bus(es) 1403 may include one or more buses connected to each other through various bridges, controllers and/or adapters as is well known in the art.

The microprocessor(s) 1405 may retrieve the instructions from the memories 1407, 1409, 1411 and execute the instructions to perform operations described above. The bus(es) 1403 interconnect system components with each other, and to a display controller and display device 1413, and to peripheral devices such as input/output (I/O) devices, which may be mice, keyboards, modems, network interfaces, printers and other devices well known in the art. Typically, the input/output devices 1415 are coupled to the system via input/output controller(s) 1417. The volatile RAM (Random Access Memory) 1409 is typically implemented as dynamic RAM (DRAM), which requires power continually in order to refresh or maintain the data in the memory, but may also include static ram (SRAM), which does not require a periodic refresh.

In one embodiment, the non-volatile memory 1411 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 1411 will also be a random access memory although this is not required. While FIG. 14 shows that the non-volatile memory 1411 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 15:
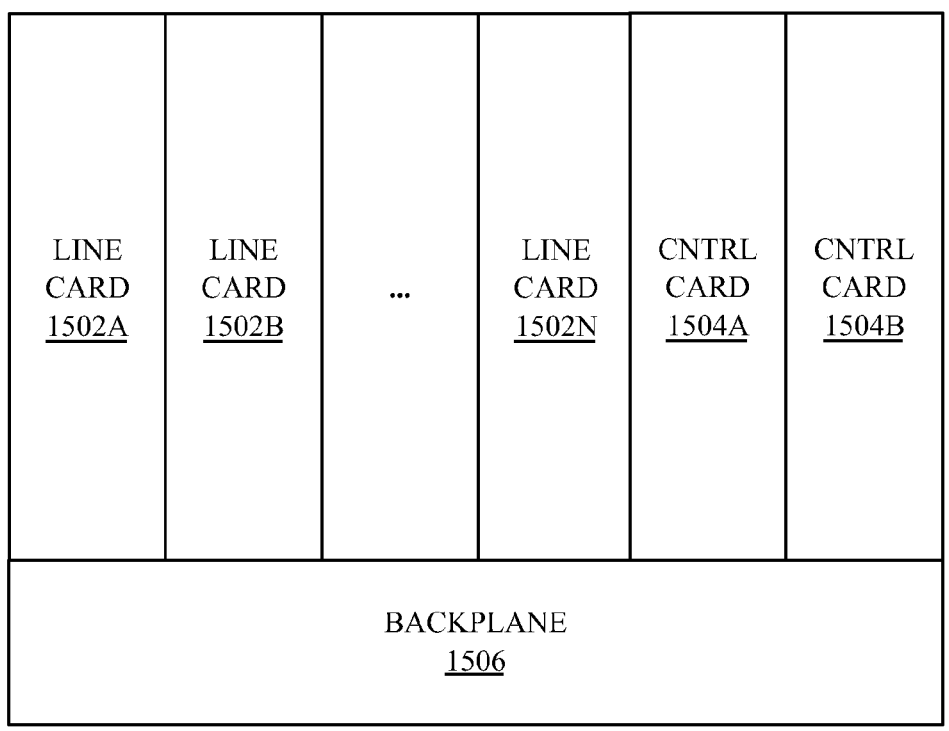
FIG. 15 is a block diagram of an additional embodiment of an exemplary network element as described herein.

FIG. 15 is a block diagram of an additional embodiment of an exemplary modular network element 1500 as described herein. In one embodiment, the network element has a modular and expandable configuration that allows the addition or removal of resources configured as line cards 1502A-N, or controller cards 1504A-B coupled to a backplane 1506. In one embodiment, the controller cards 1504A-B control the processing of the traffic by the line cards 1502A-N, which can each include one or more network data forwarding devices such as interfaces 206A-C as in FIG. 2, although the precise nature of the forwarding devices is not limited as such. In addition, the controller card 1504A-B can collect and possibly aggregate timing data as described in FIG. 8 above. In one embodiment, the line cards 1502A-N process and forward traffic according to the network policies received from controller cards the 1504A-B. In one embodiment, one or more of the line cards 1502A-N can monitor and report internal performance data, such as latency data for all or selected units of network data traversing the network element. In one embodiment, the controller cards 1504A-B can also be configured to perform all or a sub-set of functions provided by the line cards 1502A-N. It should be understood that the architecture of the network element 1500 illustrated in FIG. 15 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network element comprising:
a first port to receive production network data, wherein production network data is data that is used for purposes other than testing the performance of a network;
a second port to transmit the production network data;
a data plane coupled to the first port and the second port, the data plane to forward the production network data to the second port, wherein the data plane couples to a timing module to generate ingress timing data for the network data received at the first port and generate egress timing data for the network data transmitted via the second port, the data plane to further add a marker to the production network data that indicates to another network element to collect timing information about the production network data, and the data plane transmits the marked production network data out the second port; and
a control plane coupled to the data plane to receive the ingress timing data and the egress timing data from the data plane and to compute a network element latency for the production network data.

2. The network element as in claim 1, wherein the data plane is further to append the ingress timing data to the production network data after the production network data is received from the first port.

3. The network element as in claim 2, wherein the data plane is further to capture and remove the ingress timing data from the production network data before the second port transmits the production network data.

4. The network element as in claim 1, wherein the control plane is to further to transmit the ingress and egress timing data to an external device for correlation.

5. The network element as in claim 4, wherein the production network data includes a network data header and the control plane is to further to transmit the network data header to the external device with the ingress and egress timing data.

6. The network element as in claim 1, wherein the control plane is to further to correlate the timing data to determine latency for the production network data within the network element and transmit the latency to an external device for consolidation.

7. The network element as in claim 1, wherein the data plane is further to generate metadata to identify the production network data.

8. The network element as in claim 7, wherein the metadata is further to identify a source and destination interface for the production network data, the source interface including the first port and the destination interface including the second port.

9. The network element as in claim 8, wherein the data plane is further to append at least a portion of the metadata to the production network data after the production network data is received from the first port.

10. The network element as in claim 9, wherein the data plane is further to remove the metadata from the production network data before the second port transmits the production network data and transmit the metadata, ingress timing data and egress timing data to the control plane.

11. A non-transitory machine-readable medium storing instructions to cause one or more processing units to perform operations to determine real-time latency within a network element, the operations comprising:
receiving production network data at a first port of the network element, wherein production network data is data that is used for purposes other than testing the performance of a network;
applying an ingress timestamp to the production network data;
forwarding the production network data to a second port of the network element;
after forwarding the production network data to the second port, capturing the ingress timestamp on the production network data and determining an egress timestamp for the network data, wherein a network element latency is computed from the ingress timestamp and egress timestamp;
removing the ingress timestamp from the production network data before transmitting the network data;
adding a marker to the production network data that indicates to another network element to collect timing information about the production network data; and
transmitting the marked production network data.

12. The medium as in claim 11, the operations further comprising transmitting the ingress and egress timestamp to a data collector.

13. The medium as in claim 12, the operations further comprising generating metadata for the production network data to uniquely identify the network data, wherein the metadata includes a first identifier to identify the first port and second identifier to identify the second port.

14. The medium as in claim 13, the operations further comprising:
determining a first portion of the metadata after receiving the production network data at the first port;
appending at least the first portion of the metadata to the production network data before forwarding the production network data to the second port; and
before transmitting the network data, determining at least a second portion of the metadata and removing the first portion of the metadata from the production network data.

15. The medium as in claim 14, the operations further comprising transmitting the metadata to the data collector with the ingress and egress timestamp.

16. A non-transitory machine-readable medium having executable instructions to cause one or more processing units to perform a method of determine a latency of a path between a first and second node in a multi-path network, where the path includes an intermediate node in-between the first and second nodes, the method comprising:
receiving intra-node timing data from each of the first, second, and intermediate nodes, the intra-node timing data including a latency time for production network data within that node, wherein the intra-node timing data includes an ingress timestamp and an egress timestamp and production network data is data that is used for purposes other than testing the performance of the network, wherein multiple elements of the production network data have differing characteristics between the multiple elements and differing elements having differing characteristics have differing latency over at least one link of the multi-path network;
determining link timing data including a traversal time for each link in a path between the first, second, and intermediate node;
determining a path latency for the production network data using the link timing data and the intra-node timing data;
wherein each of the first, second, and intermediate nodes determine intra-node timing data based on a selection of the same element of the production network data to sample, each selection performed using a sampling algorithm to select the element based on one or more characteristics of the element; and
wherein the sampling algorithm is configured to sample elements based on representative characteristics of the production network data.

17. The medium as in claim 16, the method further comprising computing intra-node latency for each node based on the intra-node timing data for that node.

18. The medium as in claim 17, wherein computing intra-node latency includes subtracting a time indicated by the ingress time from the time indicated by the egress time.

19. The medium as in claim 18, wherein determining path latency for the network data includes summing the link timing data for each link in the path and the intra node latency for each node in the path.

20. The medium as in claim 18, wherein the ingress time and egress time are absolute timestamps and determining the path latency for the network data includes subtracting the time indicated by the ingress timestamp of the first node from the time indicated by the egress timestamp of the second node.

21. The medium as in claim 16, wherein multiple paths exist between the first, second and intermediate node.

22. The medium as in claim 21, wherein the path of the network data between the first, second, and intermediate node is dependent upon a characteristic of the network data.

23. The medium as in claim 22, the method further comprising determining real-time path latency for the network data for each path between the first and second nodes, wherein the first and second nodes are network elements including one or more of a router, switch, hub, bridge, or gateway and the network data includes a frame, packet, datagram, or other packet switched network data.

24. A system to determine latency for multiple paths within a multi-path network, the system comprising:
a first node to receive production network data at a first network interface coupled to the multi-path network, select an element of the production network data to sample as the element traverses the network, and forward the production network data along a link to the multi-path network, wherein production network data is data that is used for purposes other than testing the performance of the network, wherein multiple elements of the production network data have differing characteristics between the multiple elements and differing elements having differing characteristics have differing latency over at least one link of the multi-path network;
a second node to receive the production network data at a second network interface to the multi-path network, the second node to select the same element of the production network data to sample as selected by the first node;
an intermediate node coupled to the multi-path network in-between the first node and the second node, wherein each of the first, second and intermediate nodes to embed at least an ingress timestamp associated with the node within the sampled element of the production network data on ingress to the node, remove the ingress timestamp on egress from the node, and report a set of timing data including the ingress and egress timestamp, wherein the intermediate node is to select the same element of the network data to sample as the first and second nodes, each selection performed using a sampling algorithm to select the element based on one or more characteristics of the element, wherein the sampling algorithm is configured to sample elements based on representative characteristics of the production network data; and
a collector node to aggregate the sets of timing data from the first, second and intermediate nodes to determine the latency along multiple paths of the multi-path network.

25. The system as in claim 24, wherein the first node modifies a field in a header of the selected element and each of the intermediate and second nodes select the element based on the modified field.

26. The system as in claim 25, wherein the field in the header of the selected element is specific to a network protocol associated with the selected element.

27. The system as in claim 26, wherein the modification is removed from the field on egress from the second node.

28. One or more non-transitory machine-readable media having executable instructions to cause one or more processing units to perform operations to determine a latency within a network element, the operations comprising:
receiving production network data at a first port of the network element, wherein production network data is data that is used for purposes other than testing the performance of a network;
generating ingress timing data for the production network data received at the first port;
forwarding the production network data from the first port to a second port of the network element;
transmitting the production network data via the second port;
generating egress timing data for the production network data transmitted via the second port;
computing, using the ingress timing data and the egress timing data, the latency for the production network data within the network element;
adding a marker to the production network data that indicates to another network element to collect timing information about the production network data; and
transmitting the marked production network data.

29. The one or more non-transitory machine readable media as in claim 28, the operations additionally including:
appending the ingress timing data to the production network data after the production network data is received from the first port;
capturing the ingress timing data from the production network data; and
removing the ingress timing data before transmitting the production data via the second port.

30. The one or more non-transitory machine readable media as in claim 28, the operations additionally comprising transmitting the ingress timing data and the egress timing data to an external device for correlation.

31. The one or more non-transitory machine readable media as in claim 28, the operations additionally comprising transmitting the ingress timing data and the egress timing data to an external device for consolidation.

32. A method of determining a latency within a network element, the method comprising:
receiving production network data at a first port of the network element, wherein production network data is data that is used for purposes other than testing the performance of a network;
generating ingress timing data for the production network data received at the first port;
forwarding the production network data from the first port to a second port of the network element;

transmitting the production network data via the second port;
generating egress timing data for the production network data transmitted via the second port; and
computing, using the ingress timing data and the egress timing data, the latency for the production network data within the network element;
adding a marker to the production network data that indicates to another network element to collect timing information about the production network data; and
transmitting the marked production network data.

33. The method as in claim 32, additionally including:
appending the ingress timing data to the production network data after the production network data is received from the first port;
capturing the ingress timing data from the production network data; and
removing the ingress timing data before transmitting the production data via the second port.

34. The method as in claim 32, additionally comprising transmitting the ingress timing data and the egress timing data to an external device for correlation.

35. The method as in claim 32, additionally comprising transmitting the ingress timing data and the egress timing data to an external device for consolidation.

* * * * *